United States Patent [19]

Fusco

[11] 4,286,369
[45] Sep. 1, 1981

[54] TIRE MOUNTING GUIDES

[76] Inventor: Andrew Fusco, 52 Winchester Ave., Youngstown, Ohio 44509

[21] Appl. No.: 137,646

[22] Filed: Apr. 7, 1980

[51] Int. Cl.³ .............................................. B25B 27/14
[52] U.S. Cl. ...................................... 29/273; 414/426; 414/429
[58] Field of Search ................. 29/273; 157/1; 211/23, 211/24; 248/188.2, 346.1; 414/426, 429, 430, 433

[56] References Cited

U.S. PATENT DOCUMENTS

| 2,207,443 | 7/1940 | Schneider | 29/273 X |
| 2,345,458 | 3/1944 | Caron | 157/1 X |
| 2,380,415 | 7/1945 | Carruthers | 414/429 |
| 2,539,274 | 1/1951 | Sagen | 414/426 |
| 2,569,050 | 9/1951 | Gref et al. | 414/430 X |
| 2,804,222 | 8/1957 | Elling | 414/426 |
| 2,910,201 | 10/1959 | Finn | 414/426 |

Primary Examiner—James G. Smith
Attorney, Agent, or Firm—Harpman & Harpman

[57] ABSTRACT

Tire and wheel mounting guides for use with wheel mounted tires adjustably positions opposed support members against the tread of the tire so that the tire and wheel are held in movable relation to a hub of a vehicle on which the tire and wheel are being positioned.

4 Claims, 3 Drawing Figures

TIRE MOUNTING GUIDES

BACKGROUND OF THE INVENTION (1) Field of the Invention

This invention relates to tire changing devices used to hold and guide a tire while being changed on an automobile or truck.

(2) Description of the Prior Art

Prior art devices disclose a variety of different tire guide and changing apparatus. See for example U.S. Pat. No. 2,910,201 on a tire changing aid which discloses a one-piece resilient tubular metal frame with rollers mounted thereon. The tire is held between and on the rollers.

U.S. Pat. No. 2,569,050 shows a lifting and transportation dolly used to move heavy cylindrical objects having a wheeled dolly with a plurality of rollers mounted in a curved relation to one another.

In U.S. Pat. No. 2,804,222 a mounting carriage for vehicle wheels is shown having a pair of spaced horizontally positioned cones for engagement with the tire. The cone-shape compensates for a variety of different sized tires and their special relation to the ground or support surface.

In applicant's device a pair of independently movable tire and wheel supporting guides are placed adjacent either side of the tire and resiliently held in place against the tire tread. One of the pair of guides has rollers in its tire engaging surface and the other has directional points. This arrangement allows for one-way rotation and vertical movement of the tire and wheel to facilitate alignment of the same with the hub of a vehicle.

SUMMARY OF THE INVENTION

Tire mounting guides having oppositely disposed upwardly and outwardly curving surfaces are provided with resilient connecting means to hold the guides against the tread of a tire and wheel being mounted or removed from a vehicle. The upwardly and outwardly curving surfaces of the guides are respectively provided with rollers and upwardly directed points which permits the tire and wheel supported on the guides to be moved vertically and rotated in one direction to thereby facilitate the alignment of the wheel with the hub of the vehicle on which it is being mounted or removed.

DESCRIPTION OF THE PREFERRED EMBODIMENT

Figure 1:
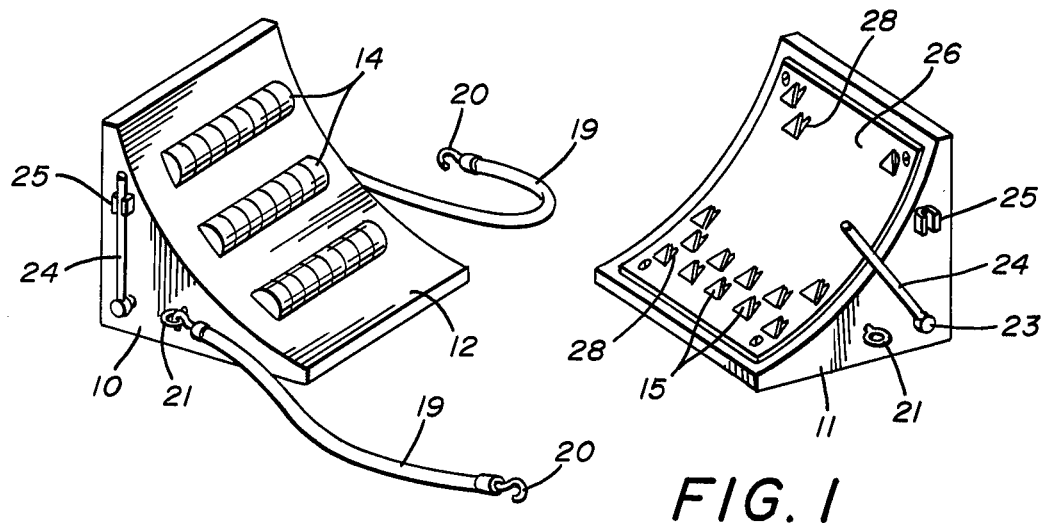
FIG. 1 is a perspective view showing the tire mounting guides and the resilient attachment cords normally urging the same toward one another.
Figure 2:
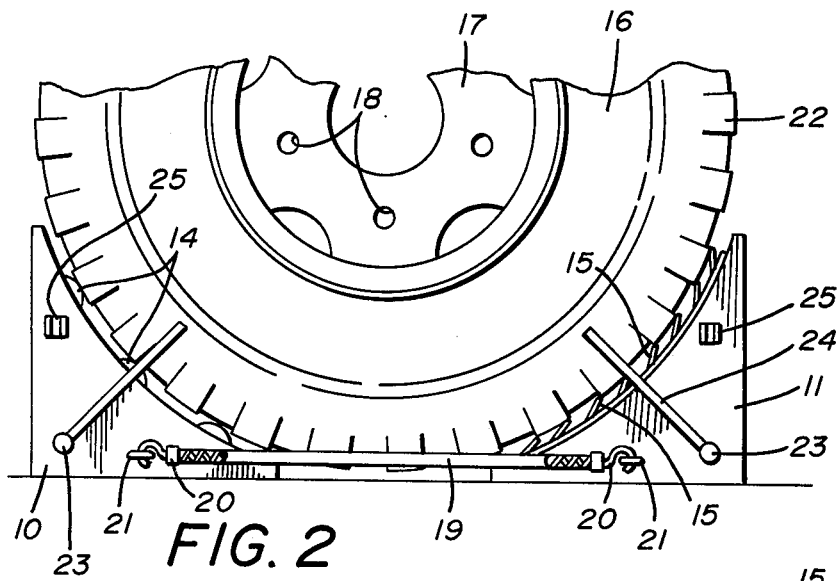
FIG. 2 is a side elevation of a vehicle wheel and tire showing the tire mounting guides in supporting position thereunder.

In the form of the invention chosen for illustration herein, the tire mounting guides comprise a pair of semi-triangular members 10 and 11, each of which has an upwardly and outwardly curving concave surface 12 and 13 respectively. The concave surface 12 of the guide 10 has a plurality of vertically spaced rows of rollers 14 journaled therein for rotation relative thereto. The other guide member 11 has a plurality of punched bent out points 15 in its upwardly and outwardly curving concave surface 13. The points are generally inclined upwardly and outwardly as seen in FIGS. 1 and 2 of the drawings. Each of the guide members 10 and 11 is sufficiently wide that it can engage the majority of the tread area of a tire such as indicated at 16 in FIG. 2 of the drawings with the tire being supported respectively on the rollers 14 and the points 15.

As illustrated in FIG. 2 of the drawings, the tire 16 is mounted on a wheel 17, which as customary is provided with a plurality of circumferentially spaced openings 18 which are arranged to be engaged over threaded studs on the wheel supporting structure of the vehicle (not shown).

By referring now to FIG. 1 of the drawings, it will be seen that there are a pair of resilient cords 19, each of which has a hook configuration 20 on its opposite ends and it will further be seen that there are eyelets 21 on each of the sides of the tire mounting guides 10 and 11.

In FIG. 2 of the drawings, one of the resilient cords 19 is shown attached by its hooks 20 to the eyelets 21 of the respective tire mounting guides 10 and 11. The pair of resilient cords 19 thus urge the tire mounting guides 10 and 11 beneath the tire 16 in the manner of wheel blocks in engagement with the tread 22 thereof. Each of the tire mounting guides 10 and 11 has a transverse shaft 23 journaled therein transversely thereto and each of the transverse shafts 23 have a right angularly disposed rod 24 attached to its outer end, the rod lying in spaced parallel relation to the side of the wheel supporting guides and being movable on an arc based on the shaft 23. Spring clips 25 are provided on each of the wheel supporting guides 10 and 11 so that the rods 24 may be engaged therein and held.

In operation, the tire mounting guides 10 and 11 are positioned in the area in which a wheel mounted tire is to be lifted and aligned with the wheel mounting means of a vehicle, the wheel mounted tire positioned thereon as shown in FIG. 2 of the drawings, and the tire and wheel manually revolved in a clockwise relation while being lifted so that the points 15 engage the tread 22 of the tire 16 and the opposite side of the tire and more specifically the tread thereon engages the rollers 14. The resilient cords 19 will thereupon move the tire mounting guide 10 toward the tire mounting guide 11 as the tire 16 moves upwardly and rotates to bring it into alignment with the threaded studs to be engaged in the openings 18 hereinbefore described.

In order that the tire 16 will retain its desired position on the tire mounting guides 10 and 11, the rods 24 are freed from the clips 25 and arranged in diagonal position as shown in FIG. 2 of the drawings where they engage the sides of the tire 16 and insure the positioning of the same relative to the tire mounting guides 10 and 11.

Figure 3:
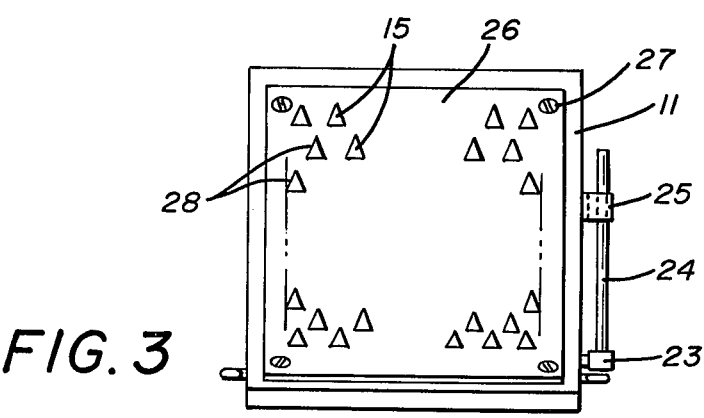
FIG. 3 is a front plan view of one of the guides.

By referring now to FIGS. 1, 2 and 3 of the drawings, it will be seen that the upwardly and outwardly curving concave surface 13 of the tire mounting guide 11 is defined by a plate 26 secured to the tire mounting guide 11 by fasteners 27 and that the several points 15 are arranged in rows and are formed by being punched from the material of the plate 26 and bent outwardly therefrom on horizontal lines 28. The construction is such that if the points 15 are bent downwardly through abnormal use, the plate 26 may be removed and the points 15 repositioned in desired angular relation as will be understood by those skilled in the art.

It will thus be seen that by utilizing the devices of the invention, a tire mounted on a wheel can be held and moved in relation to the mounting means of the vehicle with relative ease and the alignment and fastening of the mounting means readily accomplished. The arrangement and formation of the tire mounting guides is such that any wheel mounted tire on a vehicle can be readily handled and adjustably supported by a single workman thereby contributing to the speed and efficiency of changing a tire on a vehicle. Tires on rims are also easily handled.

It will thus be seen that a new and useful tire mounting guide arrangement has been illustrated and described, and it will be apparent to those skilled in the art that various changes and modifications may be made with respect to the form of the invention disclosed without departing from the spirit of the invention.

Having thus described my invention what I claim is:

1. A tire mounting guide comprising a pair of oppositely disposed wedged shaped body members, each having a flat base and spaced vertical sides and an outwardly and upwardly curving concave member positioned therebetween so as to form a tire engaging surface, a plurality of rollers positioned transversely in one of said concave members and a plurality of pointed members formed on the other of said concave members, said pointed members being directed upwardly with respect to said concave member on which they are positioned, fasteners on the opposite sides of each of said wedge shaped body members and a pair of resilient cords secured at their opposite ends to said fasteners so as to enable said resilient cords to urge said oppositely disposed wedge shaped body members toward one another in supporting relation to a wheel and tire disposed thereon.

2. The tire mounting guide set forth in claim 1 and wherein transverse shafts are rotatably mounted in each of said oppositely disposed wedge-shaped body members and right angular rods are secured to the ends of said shafts and located adjacent the vertical sides of said body members and movable on an arc based on said shafts, said rods being of a length sufficient to extend outwardly beyond said concave members.

3. The tire mounting guide set forth in claim 1 and wherein one of said concave members has transversely extending cut out areas therein, shafts secured to said concave body member and extending across each of said cut out areas and the plurality of rollers rotatably positioned on each of said shafts.

4. The tire mounting guide set forth in claim 1 and wherein one of said concave members has a plurality of V-shaped cuts formed therein with the material between the V-shaped cuts pushed outwardly from the plane of the concave member to form said pointed member.

* * * * *